June 17, 1969 H. K. BURKE 3,450,944

INTEGRITY CHECKING CIRCUIT FOR TRAIN CONTROL SYSTEM

Filed Jan. 9, 1967

INVENTOR.
HUBERT K. BURKE

BY Edward B. Goebel

HIS AGENT

United States Patent Office 3,450,944
Patented June 17, 1969

3,450,944
INTEGRITY CHECKING CIRCUIT FOR TRAIN CONTROL SYSTEM

Hubert K. Burke, Schenectady, N.Y., assignor to General Electric Company, a corporation of New York
Filed Jan. 9, 1967, Ser. No. 608,115
Int. Cl. H05h 3/26, 3/04; G08b 23/00
U.S. Cl. 317—5 5 Claims

ABSTRACT OF THE DISCLOSURE

A fail-safe circuit checks the integrity of a pair of alternating current tachometers. The ouput voltage level of a differential amplifier varies as a function of the difference in the frequency of signals from the pair of tachometers. A voltage controlled oscillator generates oscillator signals having a frequency which varies with the output voltage level of the differential amplifier. When the frequency of the oscillator signals is within the pass band of a band pass filter, indicating that the tachometers are performing satisfactorily, an emergency circuit is prevented from initiating emeregency action. When there are no oscillator signals within this pass band, a failure is indicated, and the emergency circuit is enabled.

This invention relates to train control systems, and more particularly, to circuits within such systems for varying the speed of controlled vehicles.

It is an object of this invention to provide a circuit for detecting, in a fail-safe manner, whether both of two signal sources are performing properly.

It is another object of this invention to provide a circuit for checking the integrity of a pair of signal sources, the circuit reacting similarly to a failure of one of the signal sources and to a failure in the integrity checking circuit itself.

Briefly stated, and in accordance with one aspect of this invention, differences between a measured characteristic of the signals provided by each of a pair of signal sources are used to control the output frequencies of an oscillator in an integrity checking circuit. When there are no differences between the measured characteristics of the signals, the oscillator generates output signals at a first frequency. The oscillator frequency changes in proportion to any differences between the measured characteristics of the signals.

Means are provided for coupling oscillator signals which occur within a prescribed frequency band to an emergency circuit. Upon receipt of oscillator signals within this frequency band, indicating that no undesirable changes have occurred in the measured characteristics, the emergency circuit is prevented from initiating emergency action. However, an absence of these signals at the input of the emergency circuit enables the emergency circuit to initiate some emergency action.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings, in which:

Figure 1:
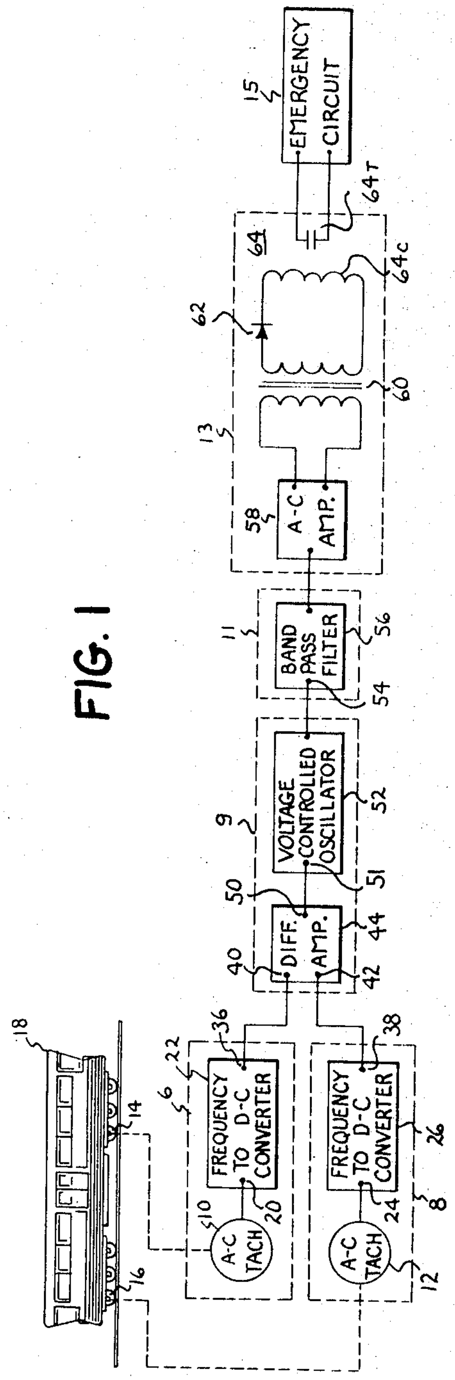
FIG. 1 shows a block diagram of a fail-safe circuit for checking the integrity of two signal sources of a tractive effort control system.

In the integrity checking circuit shown in FIG. 1, a pair of signal sources 6 and 8, whose integrity is to be monitored, each generate output signals having a characteristic proportional to the speed of a controlled vehicle 18. Means 9 are provided for responding to the output signals from the sources 6 and 8 to generated alternating-current signals having a frequency which varies with the differences in the speed-measuring characteristic of the signals. Means 9 generate alternating-current signals at a first frequency when the speed-indicating characteristics of the sources 6 and 8 are equal. The output frequency of means 9 varies from the first frequency as a function of the differences between the speed-measuring characteristics of the signals from the sources 6 and 8.

In accordance with one important feature of this invention, means 11 is provided for responding to a predetermined frequency band of signals from the means 9 to prevent an emergency circuit 15 from initiating some emergency course of action. When the signals from the means 9 are within the predetermined band, comprising the first frequency and deviations therefrom which indicate allowable differences in the speed measuring characteristics of the signals from the sources 6 and 8, the signals are passed to coupling means 13. When the signals generated by means 9 are outside of this predetermined band of frequencies, the means 11 blocks any signals from passing to the coupling means 13.

The coupling means 13 and the emergency circuit 15 are so constructed and arranged that when signals are coupled from the means 11 to the coupling means 13, the emergency circuit does not indicate that a malfunction has occurred. However, in the absence of signals at the coupling means 13, the emergency circuit 15 is enabled and can signal that a malfunction has occurred or can initiate some emergency action for the vehicle 18, such as applying full brakes to stop the vehicle.

One embodiment of the integrity checking circuit of this invention is illustrated in FIG. 1. In the particular arrangement shown, signal sources 6 and 8 each comprise an alternating-current tachometer and a frequency to direct-current converter. As shown, signal source 6 includes alternating-current tachometer 10 which generates signals having a frequency proportional to the angular velocity of a vehicle axle 14. Signals from the tachometer 10 are coupled through an input terminal 20 of a frequency to direct-current converter 22. A direct-current signal at an output terminal 36 of the converter 22 has a signal level proportional to the frequency of the tachometer 10. Similarly, signal source 8 includes an alternating-current tachometer 12 which generates signals having a frequency proportional to the angular velocity of a vehicle axle 16. The signals from tachometer 12 are coupled through an input terminal 24 of a frequency to direct-current converter 26 so that the signal level at an output terminal 38 of the converter 26 is proportional to the frequency of such signals.

The alternating-current tachometers 10 and 12 may be of any suitable type, such as the well-known dynamoelectric, magnetic, or optical types. The output frequency of the tachometers 10 and 12 may have any convenient relationship to the angular velocity of the vehicle axles 14 and 16 so as to provide a suitable signal indicative of the actual speed of the vehicle 18. For example, they may generate output signals having a frequency of approximately 3 hertz per mile per hour of the vehicle 18. Thus, if the vehicle 18 were traveling at 30 miles per hour, the signals from the tachometer 10 and 12 would have a frequency of approximately 90 hertz.

Signals from the converters 22 and 26 in the signal sources 6 and 8 are coupled to input terminals 40 and 42, respectively, of a differential amplifier 44 which compares the voltage levels of the converter signals. The differential amplifier 44 may be of the type which has output signals proportional to the difference between the voltage levels at the input terminals 40 and 42. Where the signal levels and the input terminals 40 and 42 are equal, the differential amplifier 44 has a predetermined output signal level. While this predetermined output level may be zero volts, to assure "fail-safe" operation of the system it is preferable that differential amplifier 44 produce an output of some definite level so that should a malfunction occur in the differential amplifier itself, a zero signal level at its output can be indicative of such a malfunction.

Figure 2:
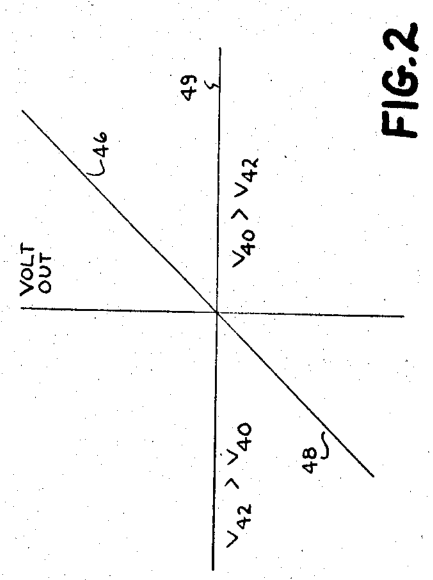
FIG. 2 shows a graph of the charactertistics of a differential amplifier which may be used in the circuit shown in FIG. 1.

The characteristic of one such differential amplifier is shown in FIG. 2. In that portion of the characteristic numbered 46, the output voltage from the differential amplifier 44 increases linearally as the voltage level at the input terminal 40 becomes greater than the voltage level at the input terminal 42. In that portion of the characteristic numbered 48, the output voltage level from the differential amplifier 44 decreases linearally as the voltage level at the terminal 42 increases with respect to the voltage level at the input terminal 40. As indicated above, the abscissa 50 should be other than the ground or common signal level. In this way, a failure of the differential amplifier 44 or another component in the integrity checking circuit which interrupts the signal at an output terminal 50 has a discrete effect on the integrity checking circuit.

Signals from the differential amplifier 44 are transferred through an input terminal 51 of a voltage controlled oscillator 52. The oscillator 52 must be of the type which generates output signals having a constant frequency, for example, 10 kilohertz, when the amplifier 44 indicates that there is no difference to the voltage levels at the output of the signals sources 6 and 8. The frequency of the signals from the oscillator 52 should then vary as a function of the changes in the input voltage level to the oscillator, as caused by differences in the voltage level at the output of the converters 22 and 26. One convenient voltage controlled oscillator which may be used is the well-known R-C timed unijunction transistor oscillator, such as shown for example on pages 130–137 of the General Electric SCR Manual, Third Edition (1964).

The frequency variable signals from the oscillator 52 are coupled to an input terminal 54 of a band pass filter 56 which comprises the means 11. The filter 56 is so constructed that it passes signals having a frequency generated by the oscillator 52 when there is no difference between voltage levels of the converters 22 and 26 at the terminals 40 and 42 of the amplifier 44. It also passes a band of frequencies which includes those frequencies generated by the oscillator 52 when the signal levels of the converters 22 and 26 are not too far apart for safety purposes. That is, filter 56 passes signals having frequencies which indicate that there has been no failure of either of the tachometers 10 and 12 or any of the components between those tachometers and the filter 56.

Signals within the pass band of the filter 56 are transferred through an alternating-current amplifier 58 and a transformer 60 in the coupling means 13. As indicated above, the band pass filter 56 attenuates alternating-current signals from the oscillator 52 which indicate some failure of the signal sources 6 and 8 or the circuit component between them and this filter. The amplifier 58 and the transformer 60 ensure that no direct-current signals are transferred to the emergency circuit 15.

Alternating-current signals amplified by 58 are transferred through a rectifier 62 to a coil 64C of a relay 64. When the relay 64 is not energized, a pair of relay contacts 64T remains open, enabling the emergency circuit 15 to indicate a malfunction has occurred or to initiate some emergency action, such as braking the vehicle 18. However, when alternating-current signals are transferred to the amplifier 58 and the transformer 60, the relay coil 64C is energized and the contacts 64T are closed, thereby disabling the emergency circuit 15.

OPERATION OF FIG. 1

During the normal operation of the circuit shown in FIG. 1, alternating-current signals are generated by the tachometers 10 and 12 as the wheels 14 and 16 of the vehicle 18 rotate. The tachometer output signals are converted to direct-current signals having a voltage level which varies with the output frequency of the signal.

The differential amplifier 44 compares the voltage level at the terminals 40 and 42 and provides a voltage which controls the output frequency of the controlled oscillator 52. When the output signals from the oscillator 52 are within the pass band of the filter 56, they are coupled through the amplifier 58 and the transformer 60 to the diode 52. The rectified signals energize the relay coil 64C which then closes the normally opened relay terminals 64C so that the emergency circuit 15 is disabled.

If the difference in voltage levels at the terminals 40 and 42 is such that a failure of one of the tachometers 10 and 12 is indicated, the frequency of the signals generated by the oscillator 52 is outside of the pass band of the filter 56. The oscillator signals are then blocked from the amplifier 58 and the remaining portion of the circuits by the filter 56. Since the relay coil 64C is not energized, the terminals 64T remain open so that the emergency circuit 15 is enabled.

Note that the most common failures of components in the integrity checking circuit result in opening the terminals 64T and thus in enabling the emergency circuit 15. For example, if either the differential amplifier 44 or the voltage controlled oscillator 52 fails, alternating-current signals are not generated. At this time the relay 64 is in its de-energized state which enables the emergency circuit 15 to indicate that a malfunction has occurred or to initiate some emergency course of action. As a result, the integrity checking circuit of this invention compares the output signals of the tachometers 10 and 12 in a fail-safe manner.

The signal sources 6 and 8 were shown as a tachometer and a frequency to direct-current converter for illustrative purposes only. Either or both of them may comprise any other type of signal source having a characteristic, such as an output signal level, which is to be compared with that of another source. For example, in one application of this invention, a direct-current overspeed reference signal level was compared with the signal level from a tachometer and frequency to direct-current converter combination. The subject integrity checking circuit was then used to indicate whether the output from the converter was at a signal level close to that of the over-speed reference signal.

Figure 3:
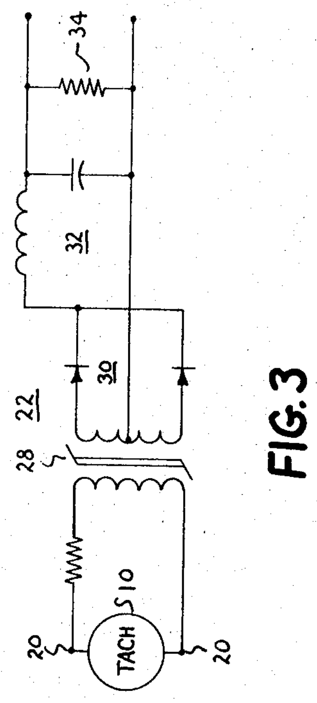
FIG. 3 is a schematic diagram of a frequency to direct-current converter which may be used in the circuit shown in FIG. 1.

FIG. 3 shows one type of frequency to direct-current converter circuit which may be used in the integrity checking circuit shown in FIG. 1. Assuming that FIG. 3 is a schematic diagram of a converter 22, tachometer signals are transferred from the tachometer 10 and through input terminal 20 to a saturable transformer 28 which provides a constant output signal for each cycle of the tachometer input signal. The secondary windings of the saturable transformer 28 are coupled through a full wave rectifier 30 to an L-C filter 32 which is connected across an output resistance 34. The saturable transformer 28 is selected so that it saturates at some time during each half-cycle of the signal transferred from the tachometer 10. Thus each output pulse has a fixed volt-second area. The rectified, fixed area pulses, when transferred through the filter 32, have an average voltage level which varies with the output frequencies of tachometer 10.

What I claim as new and desire to secure by Letters Patent of the United States is as follows:

1. For use in a vehicle tractive effort control system which includes a first signal source for generating first input signals and a second signal source for genearting second input signals, a circuit for checking the integrity of the two signal sources and causing an emergency circuit to be enabled when a malfunction of one of the signal sources is indicated, comprising, in combination:

(a) first means responsive to the first and second input signals for generating alternating-current signals having a frequency which varies with the relative signal level of the first and second input signals, the alternating-current signals being generated at a first frequency when the signal levels of the first and second input signals are equal and at frequencies which differ from the first frequency as a function of the difference in the signal levels of the input signals;

(b) second means responsive to a band of alternating-current signal frequencies for enabling the emergency circuit to initiate an emergency course of action, the band of frequencies comprising the first frequency and deviations therefrom which are generated by said first means when allowable differences occur in the signal levels of the first and second input signals; and (c) means for coupling said second means to an output of said first means so that the emergency circuit is enabled when the difference between the signal levels of the first and second signals is not within the allowable range of differences.

2. A circuit according to claim 1 wherein said first means comprises a differential amplifier for comparing the signal levels of the first and second input signals, said differential amplifier having a preselected output level above a common level for said integrity checking circuit when there is no difference in the signal levels of the first and second signals; said first means also comprising a voltage controlled oscillator coupled to the output of said differential amplifier for generating the alternating-current signals in response to the output from said differential amplifier.

3. A circuit according to claim 1 wherein said second means includes a band pass filter.

4. A circuit according to claim 1 in which at least one of the signal sources comprises an alternating-current tachometer, said circuit also including a frequency to direct-current converter connected between each of said tachometers and said first means.

5. In a vehicle tractive effort control system including first and second signal sources for generating first and second input signals which should have an equal common characteristic if the signal sources are operating satisfactorily, and including an emergency circuit which is to be enabled when a malfunction has occurred in one of said signal sources, a circuit for checking the integrity of said first and second signal sources, comprising, in combination:

(a) first means for comparing the common characteristic of the first and second input signals and generating alternating-current signals having a frequency which varies as a function of the relative differences in the common characteristic of the input signals, said first means generating alternating-current signals at a first frequency when the common characteristic of the first and second input signals is equal, means for coupling said first and second signal sources to said first means;

(b) a band pass filter coupled to said first means, the pass band of said filter comprising the first frequency and deviations therefrom which indicate that said first and second signal sources are performing satisfactorily; and (c) means for coupling said band pass filter to said emergency circuit so that signals coupled from said band pass filter can cause said emergency circuit to be disabled, while said emergency circuit is enabled in the absence of these signals.

References Cited

UNITED STATES PATENTS

| | | | |
|---|---|---|---|
| 2,719,911 | 10/1955 | Maenpaa | 246—182 |
| 2,719,912 | 10/1955 | Maenpaa et al. | 246—182 |
| 2,740,108 | 3/1956 | Plympton et al. | 340—263 |
| 2,762,464 | 9/1956 | Wilcox | 317—5 XR |
| 2,838,657 | 6/1958 | Wilcox | 246—182 |
| 3,108,263 | 10/1963 | Sylvander et al. | 340—268 |
| 3,270,199 | 8/1966 | Smith. | |
| 3,334,224 | 8/1967 | Allen et al. | |
| 3,340,951 | 9/1967 | Vitt. | |
| 3,363,096 | 1/1968 | Hughson et al. | |
| 3,402,286 | 9/1968 | Burke et al. | |

JOHN F. COUCH, *Primary Examiner.*
W. M. SHOOP, JR., *Assistant Examiner.*

U.S. Cl. X.R.

246—182; 317—19; 340—263